July 19, 1927.

C. H. H. RODANET 1,636,074

MECHANISM FOR CONTROLLING SPEED INDICATORS OR THE LIKE

Filed Oct. 7, 1924

Inventor
C. H. H. Rodanet
By Marks&Clerk
Attys.

Patented July 19, 1927.

UNITED STATES PATENT OFFICE.

CHARLES HILAIRE HENRI RODANET, OF LEVALLOIS-PERRET, FRANCE, ASSIGNOR TO SOCIÉTÉ ANONYME DES ETABLISSEMENTS ED. JAEGER, OF PARIS, FRANCE.

MECHANISM FOR CONTROLLING SPEED INDICATORS OR THE LIKE.

Application filed October 7, 1924, Serial No. 742,264, and in France July 19, 1924.

This invention relates to a mechanism more particularly adapted to be interposed between the flexible driving transmission of a speed indicator or of a meter registering the distances travelled over, and one of the steering wheels of a vehicle, so as to transmit to the said meter or indicator the relations of the wheel which serve as a basis for counting.

This mechanism which is to be used more particularly on motor vehicles when it is not possible, or when it is too complicated to ensure the actuation of the indicator or meter by rotating parts of the vehicle, other than the steering wheels, is characterized in that one of the gears of the speed reducing gear to which is connected the flexible driving transmission of the indicator or meter, is concentric with the pivoting axis of the steering wheel and actuated through an internally toothed wheel rigidly secured on the latter; the said internally toothed wheel is cut according to an involute profile so that the angular displacements of the plane of the steering wheel about its steering pivot do not influence the conditions of kinematic connection between the said steering wheel and the indicator or meter.

This general feature of the mechanism lends itself moreover to the realization of a simple assemblage or fitting of the mechanism on the steering pivot as will be explained hereafter and relates to a form of execution of the invention illustrated by way of example only in the accompanying drawing in which.

Figure 1:
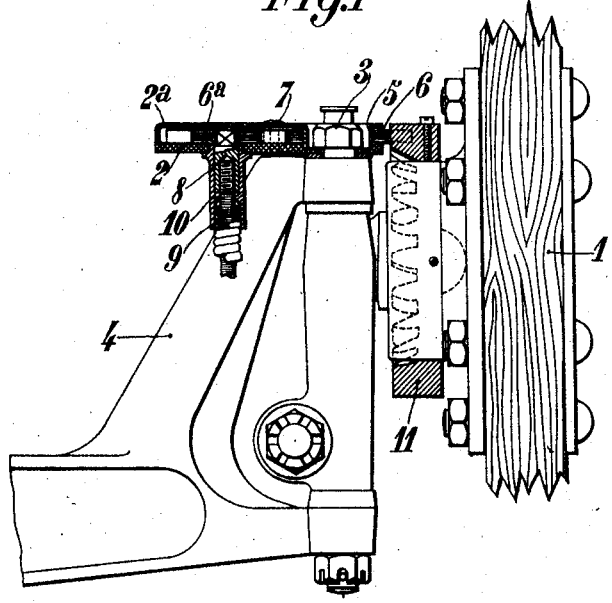
Fig. 1 is a vertical section of the mechanism.

The speed reducing gear interposed between the flexible transmission which controls the indicator or meter and the steering wheel 1 to which it is to be connected comprises two spur gears constantly in engagement and enclosed in a gear case the support 2 of which is perforated and traversed by the pivoting axis 3 of the steering wheel passing through the axle fork piece 4 in the axis of the steering pivot. This axis 3 alone ensures the fixation of the speed reducing gear without necessitatng the modification of the fork piece of the axle.

The axle of the gear case is constituted by a sheet iron plate 2ª which is flanged so as to present an inner ledge 5 constituting the axis about which rotates the pinion 6. This cover 2ª is secured on the support 2 by screws 7 or in any other suitable manner. The pinion 6ª is rigidly secured on the square end of a driving sleeve 8 connected to the finger 9 which terminates the flexible transmission of the indicator or meter. This sleeve is mounted in a bearing 10 secured in any suitable manner to the support of the gear case 2.

Figure 2:
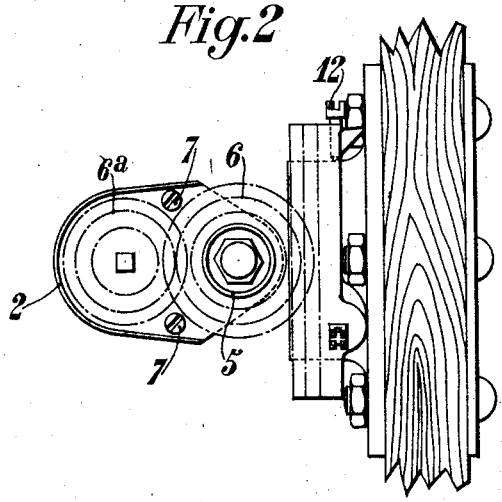
Fig. 2 is a plan view with horizontal section.

The driven pinion 6 has, as shown in Fig. 2, a portion of its circumference external to the gear case so as to be able of gearing with the internally toothed wheel 11 secured on the steering wheel 1 with which it rotates. The example illustrated applies to a steering wheel of a Ford motor car, and, in this particular case, the internally toothed wheel 11 is centered on the hub of the wheel and locked by screws 12. It is obvious that any other mode of fixation can be used according to particular cases. The teeth of the wheel 11 is an involute set of teeth as well as those of the pinions 6 and 6ª. These teeth cut on the outer face of the wheel 11 can thus constantly transmit their movement of rotation to the pinion 6 without modifying the gearing conditions when the plane of the wheel rocks about the steering pivot concentric with the pinion 6.

It is obvious that the particular form of execution of the invention which has just been described is capable of constructional modifications which as they do not alter in any way the general features set forth in the foregoing, are within the scope of the invention.

What I claim as my invention, and desire to secure by Letters Patent is:

1. In combination, a road wheel, a steering knuckle including a heavy bolt, a gear coaxially positioned on the road wheel, a support secured under the head of said bolt, a pinion meshing with the gear, and means coacting with the support to rotatably mount the pinion in the plane of the bolt head, said mounting means including a member provided with a down-turned annular flange abutting the support constituting a mounting for the pinion and surrounding the bolt head to permit access to the latter.

2. In combination, a road wheel, a steering knuckle including a headed bolt, a gear coaxially positioned on the road wheel, a support secured under the head of said bolt, a cover member provided with a downturned annular flange abutting the support, the cover member constituting a housing lying wholly within the plane of the bolt head, means securing said cover member on the support and a pinion rotatably confined on the flange and meshing with the gear.

3. In combination, a road wheel, a steering knuckle including a headed bolt, a gear coaxially positioned on the road wheel, a support secured under the head of said bolt, a cover member provided with a downturned annular flange abutting the support, the cover member constituting a housing lying wholly within the plane of the bolt head, means securing the cover member on the support, and a pinion rotatably confined on the flange and meshing with the gear, and a second pinion rotatably mounted on the support with its axis parallel to the axis of the first pinion and meshing with the latter.

4. In combination, a road wheel, a steering knuckle including a headed bolt, a gear coaxially positioned on the road wheel, a support secured under the head of said bolt, a cover member provided with a downturned annular flange abutting the support, the cover member constituting a housing lying wholly within the plane of the bolt head, means securing the cover member on the support and a pinion rotatably confined on the flange and meshing with the gear and a second pinion rotatably mounted on the support with its axis parallel to the axis of the first pinion and meshing with the latter, the second pinion being wholly received within the housing and the latter partially receiving the first pinion.

5. In a device of the character described, a housing including a support adapted to be secured to the head of the spindle of a steering knuckle and a cover member provided with marginal and annular flanges constituting spacing elements maintaining the cover member in spaced relation to the support, the annular flange being adapted to receive the head of the spindle bolt, and intermeshing pinions journalled in the housing, one of said pinions being rotatably supported on the annular flange.

In testimony whereof I have signed my name to this specification.

CHARLES HILAIRE HENRI RODANET.